United States Patent [19]

Mueller

[11] Patent Number: 4,569,521
[45] Date of Patent: Feb. 11, 1986

[54] COMPOSITE BASEBALL BAT HAVING SWAGED SPAR AND PLASTIC FOAM COVERING

[75] Inventor: Alvin W. Mueller, Ferguson, Mo.

[73] Assignee: Mueller-Perry Co., Inc., St. Louis, Mo.

[21] Appl. No.: 718,811

[22] Filed: Mar. 8, 1985

Related U.S. Application Data

[63] Continuation of Ser. No. 641,426, Aug. 17, 1984, abandoned, which is a continuation of Ser. No. 416,888, Sep. 13, 1982, abandoned, which is a continuation of Ser. No. 181,175, Aug. 25, 1980, Pat. No. 4,351,786.

[51] Int. Cl.$^4$ ............................................. A63B 59/06
[52] U.S. Cl. ............................ 273/72 A; 273/DIG. 8
[58] Field of Search ............... 273/72 A, 72 R, 80 R, 273/81 R, 82 R, 82 A, DIG. 8; 428/463; 264/46.5, 46.7, 46.9

[56] References Cited

U.S. PATENT DOCUMENTS 2,537,982  1/1951  Finn .................................... 428/463
2,857,931 10/1958  Lawton .............................. 264/46.5
3,479,030 11/1969  Merola .............................. 273/72 A
4,032,143  6/1977  Mueller et al. ..................... 273/72 R

OTHER PUBLICATIONS

3M Company Bulletin: "Scotch-Clad Fuel Resistant Coating No. 776", St. Paul, Minn., 3M Company, Adhesives, Coatings and Sealers Division, Oct. 1, 1966, 2 pages.
3M Company Bulletin: "Scotch-Grip Industrial Adhesive 847", St. Paul, Minn., 3M Company, Adhesives, Coatings and Sealers Division, Revised Oct. 1, 1976, 3 pages.

Primary Examiner—Richard C. Pinkham
Assistant Examiner—Matthew L. Schneider
Attorney, Agent, or Firm—Jerome A. Gross

[57] ABSTRACT

A composite baseball bat has a unique tapered aluminum spar encased in polyurethane foam. The tapered spar is formed by swaging, starting with an aluminum tube whose outer diameter and wall thickness are those for the barrel section of the bat. A tapering portion is swaged to a decreasing outer diameter and increasing wall thickness, which is then constant over the handle portion of the bat. This construction yields far greater stiffness and freedom from objectionable vibrations.

3 Claims, 1 Drawing Figure

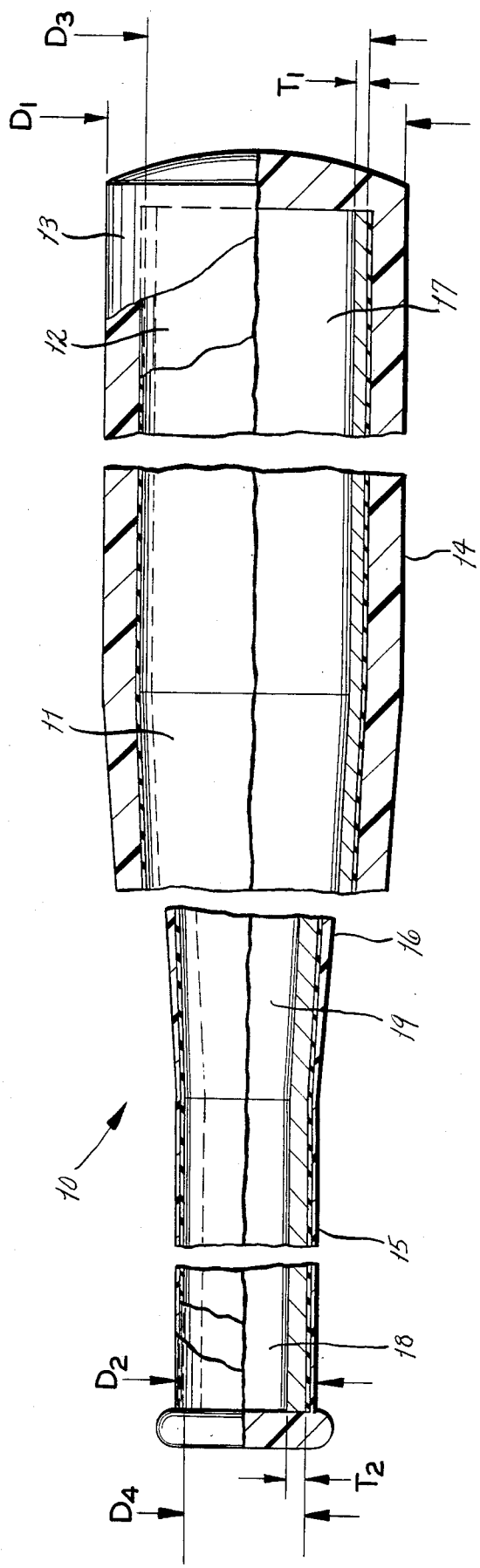

COMPOSITE BASEBALL BAT HAVING SWAGED SPAR AND PLASTIC FOAM COVERING

CROSS REFERENCE TO RELATED APPLICATION

This application is a continuation of patent application Ser. No. 06/641,426 filed 8/17/84 and now abandoned which was a continuation of patent application Ser. No. 06/416,888 filed 9/13/82 and now abandoned which was a continuation in part of patent application Ser. No. 06/181,175 filed 8/25/80 and now U.S. Pat. No. 4351786.

TECHNICAL FIELD

This invention is of a baseball bat of composite construction consisting of an aluminum spar and a polyurethane body.

BACKGROUND ART

Traditionally, bats for baseball, softball and like games have been made of wood, and the handling qualities, impact resistance, and sound of wood bats are recognized as desirable. The wood structure also dampens the reverberating vibrations in the bat that results from a hit. This dampening prevents stinging of the batter's hands, also a desirable quality.

In recent years, many softball bats have been made as welded shells of aluminum. Aluminum bats drive the ball farther than wood bats, but give an objectionable ringing sound when they contact the ball. Further, they sometimes break along their weld line; and dents cause stress concentrations which induce failures.

A type of bat designed to create the characteristics of a wood bat was disclosed in U.S. Pat. No. 4,032,143, and an improved version is shown in said co-pending application Ser. No. 06/181,175. This bat is of composite construction utilizing an aluminum core tube and a foamed polyurethane body of the type that forms an integral skin. This bat has proved to be comparable to a wood bat in many respects, in that it survives abuse much like a wood bat and sounds like one when it strikes the ball. However, the polyurethane foam was found not to add in any substantial way to the stiffness of the bat; the deflection of the core tube alone and the completed bat are approximately the same. Therefore, in order to obtain the necessary stiffness the tube had to be of such weight that the density of the polyurethane foam had to be made less than was desirable to remain within weight restrictions.

DISCLOSURE OF THE INVENTION

The present invention is a composite bat which instead of having a straight core tube, incorporates a unique aluminum spar so tapered as to constitute, in effect, a "bat within a bat."

In accordance with this invention, a bat is formed with a polyurethane body having an outer barrel portion, an inner handle portion of smaller diameter and a generally tapering intermediate portion. The spar within the body is tapered so that the outer contour somewhat follows that of the polyurethane body itself. Preferably, the outer portion of the spar is of a constant larger diameter and lesser wall thickness for a length corresponding substantially to that of the barrel portion of the bat; the inner end of the spar is of a constant smaller diameter and a greater wall thickness for a length corresponding substantially to that of the handle portion of the bat; and the intermediate portion of the spar tapers, with its diameter decreasing while its wall thickness increases from the outer end to the inner end of the spar.

This spar can best be constructed by selecting an aluminum tube whose outer diameter and wall thickness are those of the outer portion of the spar; leaving a length of the tube equal to the length of the outer portion of the spar at its original size; and swaging the remainder of the tube taperingly over a length corresponding to the intermediate portion of the spar to the smaller outer diameter and thicker wall thickness of the inner portion of the spar. As a result, the wall thickness of the swaged spar will be increased taperingly as its outer diameter is so reduced by swaging, and will be at a constant maximum wall thickness for the length of the handle portion of the bat.

This construction provides a spar whose outer diameter, in the region of the barrel, substantially exceeds the diameter of the handle of the complete composite bat. The diameter of its metal spar in the barrel portion requires a plastic cover of lesser thickness along the barrel. This permits the use of more rugged plastic foam of greater density, yet the overall weight of the bat is not increased. I have discovered by tests that when bats are of a material other than wood the bat must be stiffer—that is, it must deflect less—than wood, in order to avoid stinging of the batter's hands when he makes a hit. With the present highly tapered metal spar stiffness is greatly increased. The bat will have less tendency to bend, and will give sharper, stronger hits without objectionable vibrations.

THE DRAWINGS

FIG. 1 is a drawing of a bat embodying the present invention. The portion above the mid-line is shown partly broken away; the portion therebelow is shown in section.

BEST MODE FOR CARRYING OUT THE INVENTION

The present invention, as shown in FIG. 1, is a composite bat, generally designated 10 for baseball, softball and like games comprising a step-tapered tubular metal spar 11, preferably aluminum with a coating 12 adherent to its outer surface, and a plastic body 13 which is formed of polyurethane foam of the type which cures in place with an integral skin.

The bat 10 has an outer barrel portion 14 of a constant larger diameter designated $D_1$, an inner handle portion 15 of constant smaller diameter designated $D_2$, and an intermediate tapering portion 16.

The tubular aluminum spar 11 is hollow and extends substantially the length of the bat 10. Conforming somewhat to the shape of the bat itself, the spar has an outer end portion 17 of constant diameter (referred to hereafter as larger spar diameter $D_3$), whose length corresponds substantially to the length of the bat barrel portion 14, an inner end portion 18 of constant smaller diameter $D_4$, whose length corresponds substantially to that of the bat handle portion 15, and an intermediate tapering portion 19, whose length corresponds substantially to that of the intermediate tapering portion 16 of the bat 10. In effect, the step-tapered spar 11 is like a smaller bat within the bat 10.

In a typical bat 10 whose barrel 14 is 2.25 inches in diameter $D_1$ and whose handle 15 is 1 inch in diameter $D_2$, the diameter $D_3$ of the spar outer portion 17 is about 1.5 inches and its inner portion diameter $D_4$ is about 0.93 inches. Thus, the diameter $D_3$ is preferably about 50% greater than the diameter $D_2$ of the bat handle 15.

Furthermore, the wall thickness designated $T_1$ of the outer portion 17 of the spar 11 is constant and substantially smaller than the constant wall thickness designated $T_2$ of the inner portion 18. The wall thickness of the spar intermediate tapering portion 19 tapers from the lesser thickness $T_1$ of the outer end portion 17 to the greater thickness $T_2$ of the inner portion 18.

This unique spar is preferably formed by the following process: selecting a hollow aluminum tube having an outer diameter $D_3$ greater than the external diameter $D_2$ of the handle 15 of the bat 10 to be formed and smaller than the diameter $D_1$ of the barrel portion 14 thereof; permitting a portion of the tube corresponding in length substantially to that of the barrel portion 14 of the bat 10, to remain at its original size; and swaging the remainder of the tube to reduce its outer diameter $D_3$ taperingly over a length substantially equal to that portion of the bat 10 between its barrel portion 14 and its handle portion 15, and over the remainder of its length to a constant diameter $D_3$ which is smaller than that of the diameter $D_2$ of the handle portion 15 of the bat 10. As a result, the wall thickness of the swaged spar will be increased taperingly as its outer diameter $D_3$ is so reduced by swaging, and will be at a constant maximum wall thickness $T_2$ over the substantial length of the handle portion 15 of the bat 10.

After the spar 11 is so swaged, its outer surface is preferably coated, in the manner described in my co-pending application, Ser. No. 06/181,175, with an adhesive coating 12, of a rubbery polymer of butadiene and acrylonitrile and an oil soluble phenol-aldehyde resin.

The tapered aluminum spar 11 so coated, is then enclosed in a plastic mold in which polyurethane foam is applied around the spar 11 and its ends, but leaving the spar interior hollow. The polyurethane foam is of the type which cures in place with an exothermic reaction. Because the adhesive coating 12 is of the type which softens upon the exothermic reaction of the polyurethane foam, the foam may shrink somewhat on curing, without creating the stress regions which might result in cracking. The polyurethane foam cures to form an integral skin and has a density of 25 to 50 pounds per cubic foot, preferably about 40 pounds per cubic foot this is the density of the white ash wood which has heretofore been preferred for bats. Plastic of this density resists denting and abuse and gives off the sound of a wood bat when struck. Because the hollow tapered spar 11 occupies a large volume within the bat 10 the density of the plastic forming the plastic body 13 may thus be greater than with a smaller constant-diameter spar. The present bat 10 therefore has the durable characteristics of wood, yet is stiffer and actually deflects less than wood.

For the purpose of the claims, the plastic body 13 is referred to as having a configuration of a surface of revolution about the spar 11 with barrel portion 14 of larger diameter $D_1$, a handle portion 15 of smaller diameter $D_2$, and an intermediate tapering portion 16.

Variations from these specifications will occur to persons familiar with fabrication procedures. For example, other metals and aluminum may be found suitable for the spar and other foamed plastics than polyurethane which may adhere to the spar without any coating may be found suitable to form the plastic body.

The embodiments of the invention in which an exclusive property or privilege is claimed are defined as follows:

1. A bat for baseball and the like comprising the combination of an integral hollow tubular aluminum spar extending nearly the entire length of the bat and an integral foam plastic body molded about the entire outer surface of said spar and conforming to and providing the exterior size and configuration of said bat, said spar and plastic body together providing a bat barrel portion, a bat handle portion, and a bat portion intermediate said barrel and handle portions, said foam plastic body having a density of between 25 pounds to 50 pounds per cubic foot, and having an integral outer skin, the thickness of said foam plastic body varying from its thickness in the bat barrel portion to a substantially lesser thickness in the bat handle portion, said foam plastic body further including integral molded ends at both the handle and barrel portions of the bat, said hollow tubular spar itself having an outer end spar portion, an inner end spar portion and an intermediate spar portion, said outer end spar portion being of a constant cross-section whose diameter is substantially one and one-half times as great as the outer diameter of the entire bat handle portion, the wall thickness of said constant section outer end spar portion being substantially less than the wall thickness of said inner end spar portion, said intermediate spar portion tapering in both diameter and thickness between those of said outer end spar portion and of said inner end spar portion, the said spar being formed, along said intermediate and inner end spar portions, by swaging a tube whose original diameter and wall thickness were those of said spar outer portion, whereby in conjunction with said swaged spar, the mass of the plastic body, so varying in thickness, affords desirable handling qualities without tip weighting.

2. A bat for baseball and the like as defined in claim 1, wherein said foam plastic body is formed of polyurethane foam of the type which cures in place with an accompanying exothermic reaction and shrinkage, together with a coating adherent to the outer surface of said tubular aluminum spar and bonding the said foam plastic body thereto, the coating being of the type which softens at elevated temperature resulting from the exothermic reaction of the said polyurethane foam and thereafter hardens and bonds securely.

3. A bat for baseball and the like as defined in claim 2, the said coating comprising substantially a rubbery polymer of butadiene and acrylonitrile and an oil soluble phenol-aldehyde resin.

* * * * *